United States Patent Office 3,414,525
Patented Dec. 3, 1968

3,414,525
CATALYST MANUFACTURE
Edward Michalko, Chicago, Ill., assignor to Universal Oil Products Company, Des Plaines, Ill., a corporation of Delaware
No Drawing. Filed Mar. 16, 1966, Ser. No. 534,624
7 Claims. (Cl. 252—453)

ABSTRACT OF THE DISCLOSURE

Preparation of catalyst by dispersing a crystalline aluminosilicate in a silica sol, effecting gellation of the sol and aging the gel at an alkaline pH, thereafter adjusting the pH of the gel to from about 3.5 to about 5.0, commingling a partial hydrolysis product of aluminum sulfate with the aforesaid silica gel, and then completing the hydrolysis of said partial hydrolysis product in admixture with the silica gel containing the aluminosilicate.

This invention relates to a novel method of catalyst manufacture. More specifically, the present invention relates to a novel method for the manufacture of an aluminosilicate-silica-alumina catalyst.

The commercial manufacture of synthetic silica-alumina catalysts is generally and advantageously accomplished through a series of process steps involving initially the formation of a silica hydrosol by acidifying sodium silicate with a mineral acid, usually sulfuric acid, in aqueous solution. Arter a suitable period of time has elapsed, during which the hydrosol is permitted to age at the acidic conditions and polymerize to a complex polysilicic acid, the hydrogel is adjusted to an alkaline pH, usually about 7.0–7.5. After the hydrogel has been aged at the alkaline pH for a time sufficient to develop optimum pore volume, the slurry is impregnated with an aluminum sulfate solution. Prior to the aluminum sulfate impregnation it is necessary to adjust the slurry to an acid pH of less than about 3.5 to obviate premature precipitation of the aluminum sulfate and the resultant formation of distinct particles of alumina and silica rather than the desired silica-alumina complex. The aluminum sulfate solution is therefore allowed sufficient time to permeate the slurry at the acid pH. Addition of the aluminum sulfate solution to the acidified slurry further lowers the pH to about 2–3. At the expiration of suitable period of time, the aluminum sulfate is hydrolyzed and precipitated by the addition of a basic precipitant, usually ammonium hydroxide, to the acidic slurry.

More recently, improved catalysts have been prepared by the inclusion of a finely divided zeolite or crystalline aluminosilicate, either naturally occurring or synthetically prepared, within the silica-alumina matrix. However, due to the tendency of aluminosilicates toward instability when exposed to acidic conditions of pH less than about 3.5–4.0 for any substantial period of time, the above described method of manufacture has heretofore been precluded as a suitable method of commercial manufacture of crystalline aluminosilicate-containing catalysts.

It is an object of this invention to adapt the method of manufacture hereinabove described to the manufacture of a crystalline aluminosilicate-silica-alumina catalyst and thereby derive an improved catalyst. In one of its broad aspects the present invention embodies a method of catalyst manufacture which comprises dispersing a finely divided crystalline aluminosilicate in a silica sol, effecting gelatin of the sol and aging the gel at an alkaline pH, thereafter adjusting the pH of the gel to a pH of from about 3.5 to about 5.0, separately commingling ammonium hydroxide and aluminum sulfate in a mole ratio to effect a soluble partial hydrolysis product of said aluminum sulfate, commingling the partial hydrolysis product with the aforesaid silica gel containing a crystalline aluminosilicate dispersed therein at said pH of from about 3.5 to about 5.0, thereafter effecting complete hydrolysis of the aluminum sulfate and recovering the resultant crystalline aluminosilicate-silica-alumina composite.

Other objects and embodiments of this invention will become apparent in the following detailed specification.

Pursuant to the method of manufacture of this invention, a finely divided crystalline aluminosilicate is initially dispersed in a silica sol. The silica sol can be one prepared by the general method hereinabove described, i.e., by acidification of sodium silicate with a mineral acid such as sulfuric acid, hydrochloric acid, and the like, in aqueous solution, the final pH thereof being about 4.0–4.5.

The crystalline aluminosilicates utilized in accordance with the method of this invention are frequently referred to as zeolites or molecular sieves and may be those which are naturally occurring or synthetically prepared. These materials are essentially the dehydrated forms of crystalline hydrous siliceous zeolites containing varying amounts of aluminum and alkali metal with or without other metals. The alkali metal atoms are arranged with the silicon, aluminum and oxygen atoms in the form of an aluimnosilicate salt in a definite and consistant crystal pattern.

The synthetic crystalline aluminosilicates may be prepared in any conventional or otherwise convenient manner. One preferred method comprises forming an aqueous solution of sodium aluminate and sodium hydroxide and adding thereto an aqueous sodium silicate solution. The resulting reaction mixture preferably comprises a molar ratio of $Na_2O$ to $SiO_2$ of at least about 0.4 to 1 and generally not in excess of about 2 to 1. Sodium aluminate with a molar ratio of $Na_2O$ to $Al_2O_3$ of about 1.5 to 1 is suitably employed. The amounts of sodium silicate solution and sodium aluminate solution are such that the mole ratio of silica to alumina in the final mixture is at least 3.0 to 1.0. Preferably, the reaction mixture has a composition expressed as a mixture of oxides as follows: $SiO_2$ to $Al_2O_3$ in a ratio of about 6 to 20, $Na_2O$ to $SiO_2$ in a ratio of about 0.6 to 1.5 and $H_2O$ to $Na_2O$ in a ratio of about 35 to 60. In any case, the reaction mixture is heated, usually at a temperature of about 212° F., in a closed vessel to avoid water loss. The crystalline aluminosilicate reaction product which precipitates from the hot reaction mixture is separated and water-washed until the water in equilibrium with the crystals attains a pH of from about 9 to about 12. Suitable crystalline aluminosilicates or zeolites include faujasite, chabazite, mordenite, and the like. Those crystalline aluminosilicates characterized by pore openings of from about 6 to about 15 Angstroms are generally preferred in hydrocarbon conversion processes. The crystalline aluminosilicate may be dried before being dispersed in the silica sol as aforesaid or said aluminosilicate can be adde without prior drying.

The silica sol containing the finely divided crystalline aluminosilicate dispersed therein is adjusted to an alkaline pH, usually about 7.0–7.5, whereby a complex silica hydrogel embodying the dispersed crystalline aluminosilicate is precipitated. After the hydrogel has been aged at the alkaline pH for a time sufficient to develop a suitable pore structure, the slurry is adjusted to an acid pH of from about 3.5 to about 5.0, preferably about 3.9–4.3 and impregnated with an aqueous solution of a preneutralized aluminum sulfate.

The last mentioned preneutralized aluminum sulfate is a partially hydrolyzed aluminum sulfate. Partial hydroylsis of the aluminum sulfate is suitably accomplished by commingling ammonium hydroxide and aluminum sulfate in a mole ratio of about 4 to 1 and stirring the same together until a solution is obtained. The partial hydrolysis is conveniently effected in aqueous solution, usually by the addition of a dilute aqueous ammonium hydroxide solution to a dilute aqueous solution of aluminum sulfate. The preneutralized aluminum sulfate herein contemplated may be described as aluminum sulfate wherein two of the three sulfate radicals have been replaced with hydroxyl radicals. However, it may very well be that the preneutralized or partially hydrolyzed aluminum sulfate exists as a chemical complex which nevertheless comprises a ratio of about 2 hydroxyl radicals per aluminum ion present. In any case, the preneutralized aluminum sulfate of this invention is unique with respect to aluminum sulfate and the other hydrolysis products in that it exists in a clear water-white solution to permeate the silica hydrogel at a relatively high pH and, by virtue of its acquired hydroxy substituents, becomes chemically bound to said hydrogel in a fixed relationship prior to gelation to give a more uniform catalyst composition.

The preneutralized aluminum sulfate herein described is an essential feature of this invention. Aluminum sulfate, a completely hydrolyzed aluminum sulfate or a partially hydrolyzed aluminum sulfate comprising less than about 2 hydroxy radicals per aluminum ion present are substantially inoperable to accomplish the objectives of this invention. It will be appreciated that a selective hydrolysis as herein contemplated is best effected under conditions of rapid stirring and intimate contact of the reactants. Of particular importance to the present invention is the fact that the preneutralized aluminum sulfate can be commingled with the aluminosilicate-silica gel slurry as an alumina source at a higher pH than is normally the case and, in addition, the pH of the slurry is not substantially lowered by the addition of the preneutralized aluminum sulfate so as to be detrimental to the crystalline aluminosilicate component during the subsequent acid age period.

In the further preparation of the aluminosilicate-silica-alumina catalyst in accordance with the method of this invention, the preneutralized aluminum sulfate is commingled with the aluminosilicate-silica hydrogel at a pH of from about 3.5 to about 5 and, after a suitable period of acid aging, the preneutralized aluminum sulfate is completely hydrolyzed at an alkaline pH to form an aluminosilicate-silica-alumina hydrogel. The hydrogel thus prepared is further processed in accordance with prior art practice to arrive at the final aluminosilicate-silica-alumina composite in usable form. For example, the slurry is filtered and washed to concentrate and partially remove the soluble salts. The filter cake is then mixed with water to a smooth consistency and subjected to spray drying whereby the aqueous slurry is sprayed in an atomized state into an atmosphere of hot inert gases to effect a rapid evaporation of moisture so that dried particles of a predetermined size range fall out of the spray. The spray dried material is thereafter reslurried and subjected to multiple stage washing to reduce the soluble content to an acceptable level. It is desirable to employ an ion exchange technique during the multiple stage washing whereby the composite is treated with a dilute acid wash and/or ammonium salts to remove sodium ions and filtered and reslurried with dilute ammonia solution to remove sulfate ions. In this manner, the number of water-washings is minimized. The composite is then dried, usually at a temperature of from about 300° F. to about 700° F.

The alkali metal crystalline aluminosilicate component of the catalytic composite prepared in accordance with the method of this invention is base exchanged substantially free of the alkali metal, the practice being well established in the art. While the base exchange can be effected prior to commingling the aluminosilicate with the silica sol or prior to commingling the aluminosilicate-silica hydrogel with the preneutralized aluminum sulfate, it is preferred to base exchange the aluminosilicate while suspended in the silica-alumina matrix of the finished catalyst. For example, the aluminosilicate-silica-alumina composite is treated with aqueous ammonia and/or an aqueous solution of a soluble compound of calcium, magnesium, vanadium, chromium, cerium, aluminum, lanthanium, praseodymium, neodymium, samarium, and other rare earth metals as well as solutions of mixtures of these compounds, said aqueous solution being characterized by a pH of about 4.5 or more. The resulting base exchanged material is washed free of water soluble material, dried and thermally activated in an inert atmosphere, usually air, at a temperature of from about 500° F. to about 1500° F.

The following example is presented in illustration of one embodiment of this invention and is not intended as an undue limitation on the generally broad scope of the invention as set out in the appended claims.

A silica hydrosol was prepared by the addition of 19.76 liters of 6.9% water glass in aqueous solution to 2.34 liters of 25% sulfuric acid solution at about 100° F. in a continuously stirred 40 liter capacity polyethylene reaction vessel, the pH of the resulting mixture being about 4.2. About 268 grams of faujasite (~25% volatile) was added to the hydrosol thus prepared, gelatine occurring within about 10 minutes. Stirring was continued for an additional 20 minutes. The pH of the resultant slurry was thereafter adjusted to 7.5 by the addition of 150 milliliters of 15% aqueous ammonia solution. The slurry was then aged at the 100° F. and with stirring for about one hour, the pH rising to 7.9. The pH of the slurry was then adjusted to 5.0 by the addition of 150 milliliters of 25% sulfuric acid. Thereafter, a preneutralized or partially hydrolyzed aluminum sulfate was added to the stirred slurry, the pH being thereby further lowered to 4.0, and the resulting slurry was aged for one hour. The preneutralized aluminum sulfate had been prepared by the addition of 1.54 liters of 28% ammonium solution to a Waring blender containing therein 6.27 liters of a vigorously stirred aqueous aluminum sulfate solution containing the equivalent of 6.9 wt. percent alumina, and stirring the same together for about one hour at a pH of 4.0. The aforesaid slurry was then adjusted to a pH of 7.0 by adding thereto 1.02 liters of 15% ammonia solution to complete the hyrolysis of aluminum sulfate. The slurry was filtered, reslurried to 10 wt. percent solids content, and then spray dried. About 1 liter of the spray dried material was then washed with an ammoniacal-ammonium chloride solution to a sulfate-free level and subsequently dried at 400° F. for 5 hours. The resultant dried material (510 grams) was soaked in 1.5 liters of a solution containing about 55 milliliters of a rare earth chloride solution (equal to about 17.7 grams of mixed rare earths) for 2 hours. The soaked material was then filtered, washed free of chloride, dried at 400° F. and calcined 2 hours at 600° F.

The catalyst thus prepared was steam deactivated by passing a 60% mixture of steam in air in contact with the catalyst at a temperature of 1400° F. for a period of 12 hours. Thereafter, the catalyst, hereinafter referred to as catalyst "B," was evaluated with reference to a freshly prepared silica-alumina catalyst containing 26% alumina hereinafter referred to as catalyst "A." The evaluation procedure consisted in charging a gas oil with an initial boiling point of about 500° F. to a vertical stainless steel tubular reactor containing 25 cubic centimeters of the catalyst to be evaluated in a fixed bed therein. The gas oil was charged at a rate of 100 cubic centimeters per hour and the reactor maintained at 932° F. The conversion to gasoline and gas was lined out at 55% and the temperature required was recorded, and the weight percent gasoline obtained, and carbon deposit on the catalyst were determined. The following tabulation is not necessarily to show improvement of the catalyst prepared in accordance with the present invention, although such is the case, but as a strong indication that the faujasite com-

|   | Cat. A | Cat. B |
|---|---|---|
| Deg. F. (required for 55% conv.) | 915 | 872 |
| Gasoline, wt. percent | 29.2 | 36.4 |
| Carbon, wt. percent | 8.3 | 6.9 |

I claim as my invention:

1. A method of catalyst manufacture which comprises dispersing a crystalline aluminosilicate in a silica sol, effecting gelation of the sol and aging the gel at an alkaline pH, thereafter adjusting the pH of the gel to form about 3.5 to about 5.0, separately commingling ammonium hydroxide and aluminum sulfate in a ratio to form a soluble partial hydrolysis product of said aluminum sulfate in which two of the three sulfate radicals have been replaced with hydroxyl radicals, commingling the partial hydrolysis product with the aforesaid silica gel containing the aluminosilicate dispersed therein at said pH of from about 3.5 to about 5.0, thereafter completing the hydrolysis of said partial hydrolysis product in admixture with said silica gel containing the aluminosilicate, and recovering the resultant aluminosilicate-silica-alumina composite.

2. The method of claim 1 further characterized in that said partial hydrolysis product is prepared by commingling amonium hydroxide and aluminum sulfate in a mole ratio of about 4 to 1.

3. The method of claim 2 further characterized in that the pH of the silica gel is adjusted to from about 3.9 to about 4.3 and the partial hydrolysis product commingled therewith at said pH.

4. The method of claim 3 further characterized in that said aluminosilicate-silica-alumina composite is base exchanged with a rare earth metal.

5. The method of claim 4 further characterized in that said aluminosilicate is a finely divided faujasite.

6. The method of claim 4 further characterized in that said aluminosilicate is a finely divided chabazite.

7. The method of claim 4 further characterized in that said aluminosilicate is mordenite.

References Cited

UNITED STATES PATENTS

| 2,777,822 | 1/1957 | Wilson | 252—453 |
| 2,844,523 | 7/1958 | Veltman et al. | 252—453 X |
| 3,131,156 | 4/1964 | Wilson et al. | 252—455 |
| 3,169,931 | 2/1965 | De Rosset et al. | 252—453 |
| 3,183,194 | 5/1965 | Kuwata et al. | 252—453 X |
| 3,301,994 | 1/1967 | Cramer et al. | 252—455 X |

DANIEL E. WYMAN, *Primary Examiner.*

C. F. DEES, *Assistant Examiner.*